US008982753B2

(12) United States Patent
Diab

(10) Patent No.: US 8,982,753 B2
(45) Date of Patent: Mar. 17, 2015

(54) METHOD AND SYSTEM FOR LOW LATENCY STATE TRANSITIONS FOR ENERGY EFFICIENCY

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 925 days.

(21) Appl. No.: 12/470,991

(22) Filed: May 22, 2009

(65) Prior Publication Data

US 2010/0110952 A1    May 6, 2010

Related U.S. Application Data

(60) Provisional application No. 61/111,653, filed on Nov. 5, 2008.

(51) Int. Cl.
G08C 17/00      (2006.01)
H04L 12/12      (2006.01)
(Continued)

(52) U.S. Cl.
CPC ............ *H04L 12/12* (2013.01); *H04W 52/0235* (2013.01); *H04W 52/0274* (2013.01); *H04W 52/0219* (2013.01); *H04L 12/40032* (2013.01); *H04L 12/40039* (2013.01); *H04L 12/40136* (2013.01); *Y02B 60/31* (2013.01); *Y02B 60/34* (2013.01); *Y02B 60/35* (2013.01); *Y02B 60/43* (2013.01); *Y02B 60/44* (2013.01)
USPC ......... 370/311; 455/343.2; 455/574; 713/324

(58) Field of Classification Search
None
See application file for complete search history.

(56) References Cited

U.S. PATENT DOCUMENTS

| 6,856,597 B1 | 2/2005 | Scott |
| 6,993,667 B1 * | 1/2006 | Lo ................................ 713/320 |
| 7,050,517 B1 | 5/2006 | Sallaway et al. |

(Continued)

FOREIGN PATENT DOCUMENTS

| EP | 1 473 870 | 11/2004 |
| EP | 1484876 | 12/2004 |

(Continued)

OTHER PUBLICATIONS

Teener, "Audio/Video Bridging for Home Networks (IEEE 802.1 AV Bridging Task Group)" [Online] Jun. 1, 2007, http://www.ieee802. org/3/eee_study/public/jul07/teener_1_0707.pdf.

(Continued)

*Primary Examiner* — Khoa Huynh
(74) *Attorney, Agent, or Firm* — Duane S. Kobayashi

(57) ABSTRACT

Aspects of a method and system for physical layer control of low latency state transitions for energy efficiency. In this regard, a determination may be made to reconfigure a network device from an energy saving mode of operation to a higher performance mode of operation. A first portion of the network device may be reconfigured prior to sending an indication of the reconfiguration to a link partner, and a remaining portion of the network device may be reconfigured after sending the indication. The link partner may begin reconfiguration from an energy saving mode of operation to higher performance mode of operation upon receiving the indication. The energy saving mode may comprise a low power idle (LPI) or a subset PHY mode. The reconfiguration may comprise allocating memory to, and/or de-allocating memory from, buffering received and/or to-be-transmitted data.

20 Claims, 8 Drawing Sheets

(51) Int. Cl.
*H04W 52/02* (2009.01)
*H04L 12/40* (2006.01)

(56) References Cited

U.S. PATENT DOCUMENTS

| | | |
|---|---|---|
| 7,308,058 B2 | 12/2007 | Zerbe et al. |
| 2003/0226050 A1 | 12/2003 | Yik et al. |
| 2005/0188232 A1 | 8/2005 | Weng et al. |
| 2006/0034295 A1* | 2/2006 | Cherukuri et al. ....... 370/395.52 |
| 2007/0121663 A1* | 5/2007 | Yousefi et al. ................ 370/446 |
| 2007/0280239 A1 | 12/2007 | Lund |
| 2008/0225841 A1 | 9/2008 | Conway et al. |
| 2008/0225879 A1 | 9/2008 | Powell |
| 2008/0225894 A1* | 9/2008 | Powell ........................ 370/477 |
| 2009/0180529 A1 | 7/2009 | Agazzi et al. |
| 2010/0128738 A1 | 5/2010 | Barrass |
| 2010/0241880 A1 | 9/2010 | Werthiemer et al. |
| 2010/0262848 A1 | 10/2010 | Bobrek et al. |

FOREIGN PATENT DOCUMENTS

| | | |
|---|---|---|
| EP | 1 494 407 | 1/2005 |
| GB | 2337672 | 11/1999 |
| GB | 2337672 A | 11/1999 |
| WO | WO 00/31923 | 6/2000 |

OTHER PUBLICATIONS

Grow, "802.1 and Energy Efficient Ethernet." Sep. 11, 2007, pp. 1-6, XP002509616.
Grow, "802.1 and Energy Efficient Ethernet", [Online] Sep. 11, 2007, pp. 1-6, http://www.ieee802.org/3/eee_study/public/sep07/grow_1_0907.pdf.
Gupta et al., "Dynamic Ethernet Link Shutdown for Energy Conservation on Ethernet Links." IEEE, Jun. 24, 2007. XP002524616.
Wael Diab, "Energy Efficient Ethernet and 802.1." Nov. 2007. XP002524617.
European Search Report corresponding to European Patent Application No. 09013753.0-1244, dated Apr. 6, 2010.
Bennett et al., "Energy Efficient Ethernet", [Online] IEEE 802 Tutorial, Jul. 16, 2007, http://www.ieee802.org/802_tutorials/july07/IEEE-tutorial-energy-efficient-ethernet.pdf.
TW Office Action, Sep. 18, 2013.

* cited by examiner

METHOD AND SYSTEM FOR LOW LATENCY STATE TRANSITIONS FOR ENERGY EFFICIENCY

CROSS-REFERENCE TO RELATED APPLICATIONS/INCORPORATION BY REFERENCE

This patent application makes reference to, claims priority to and claims benefit from U.S. Provisional Patent Application Ser. No. 61/111,653, filed on Nov. 5, 2008.

This application also make reference to:
U.S. patent application Ser. No. 12/470,785 filed on even date herewith;
U.S. patent application Ser. No. 12/470,970 filed on even date herewith.

Each of the above stated applications is hereby incorporated herein by reference in its entirety.

FIELD OF THE INVENTION

Certain embodiments of the invention relate to networking. More specifically, certain embodiments of the invention relate to a method and system for low latency state transitions for energy efficiency

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. As an increasing number of portable and/or handheld devices are enabled for Ethernet communications, battery life may be a concern when communicating over Ethernet networks. Accordingly, ways of reducing power consumption when communicating over electronic networks may be needed. Furthermore, ways of improving energy efficiency while maintaining compatibility with existing infrastructure and minimizing the redesign of network components are desirable.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for low latency state transitions for energy efficiency transitions, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for low latency state transitions for energy efficiency. In various embodiments of the invention, a determination may be made to reconfigure a network device from an energy saving mode of operation to a higher performance mode of operation. A first portion of the network device may be reconfigured prior to sending an indication of the reconfiguration to a link partner, and a remaining portion of the network device may be reconfigured after sending the indication. The link partner may begin reconfiguration from an energy saving mode of operation to higher performance mode of operation upon receiving the indication. The indication may comprise one or more physical layer signals and/or packets. Components of the network device that may be reconfigured may comprise one or more transmitters, receivers, NEXT cancellers, FEXT cancellers, and/or echo cancellers of the network device. The energy saving mode may comprise a low power idle (LPI) mode. The energy saving mode may comprise a subset PHY mode. The reconfiguration may comprise allocating memory to, and/or de-allocating memory from, buffering received and/or to-be-transmitted data. The memory may be allocated or de-allocated based on an amount of time required for the reconfiguration. The memory may be allocated or de-allocated based on an amount of time required for reconfiguration of a link partner communicatively coupled to the network device.

Figure 1:
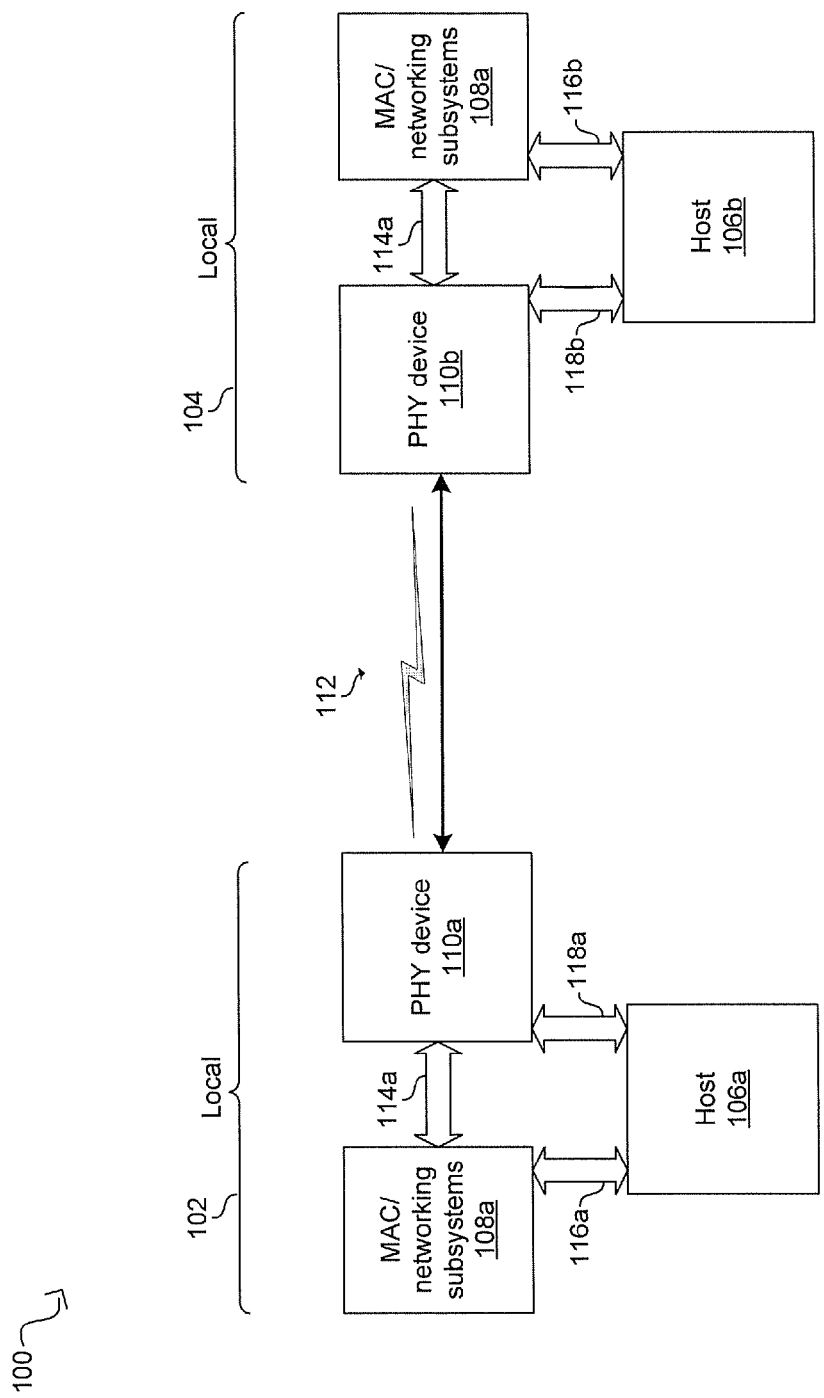
FIG. 1 is a block diagram illustrating an exemplary Ethernet connection between two network devices, in accordance with an embodiment of the invention.

FIG. 1 is a block diagram illustrating an exemplary Ethernet connection between a two network devices, in accordance with an embodiment of the invention. Referring to FIG. 1, there is shown a system 100 that comprises a network device 102 and a network device 104. The network devices 102 and 104 may be link partners that communicate via the link 112 and may comprise, respectively, hosts 106a and 106b, networking subsystems 108a and 108b, PHY devices 110a and 110b, interfaces 114a and 114b, interfaces 116a and 116b, and interfaces 118a and 118b. The interfaces 114a and 114b are referenced collectively or separately herein as interface(s) 114, and the interfaces 116a and 116b are referenced collectively or separately herein as interface(s) 116. The hosts 106a and 106b are referenced collectively or separately herein as host(s) 106. The networking subsystems 108a and 108b are referenced collectively or separately herein as networking subsystem(s) 108. The PHY devices 110a and 110b are referenced collectively or separately herein as PHY device(s) 106.

The link 112 is not limited to any specific medium. Exemplary link 112 media may comprise copper, wireless, optical and/or backplane technologies. For example, a copper medium such as STP, Cat3, Cat5, Cat 5e, Cat 6, Cat 7 and/or Cat 7a as well as ISO nomenclature variants may be utilized. Additionally, copper media technologies such as InfiniBand, Ribbon, and backplane may be utilized. With regard to optical media for the link 112, single mode fiber as well as multi-mode fiber may be utilized. With regard to wireless, the network devices 102 and 104 may support one or more of the 802.11 family of protocols. In an exemplary embodiment of the invention, the link 112 may comprise up to four or more physical channels, each of which may, for example, comprise an unshielded twisted pair (UTP). The network device 102 and the network device 104 may communicate via two or more physical channels comprising the link 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP.

The network devices 102 and/or 104 may comprise, for example, switches, routers, end points, routers; computer systems, audio/video (A/V) enabled equipment, or a combination thereof. In this regard, A/V equipment may, for example, comprise a microphone, an instrument, a sound board, a sound card, a video camera, a media player, a graphics card, or other audio and/or video device. Additionally, the network devices 102 and 104 may be enabled to utilize Audio/Video Bridging and/or Audio/video bridging extensions (collectively referred to herein as audio video bridging or AVB) for the exchange of multimedia content and associated control and/or auxiliary data. Also, the network devices may be operable to implement security protocols such IPsec and/or MACSec.

The hosts 106a and 106b may be operable to handle functionality of OSI layer 3 and above in the network devices 102 and 104, respectively. The hosts 106a and 106b may be operable to perform system control and management, and may comprise hardware, software, or a combination thereof. The hosts 106a and 106b may communicate with the networking subsystems 108a and 108b via interfaces 116a and 116b, respectively. The hosts 106a and 106b may additionally exchange signals with the PHY devices 110a and 110b via interfaces 118a and 118b, respectively. The interfaces 116a and 116b may correspond to PCI or PCI-X interfaces. The interfaces 118a and 118b may comprise one or more discrete signals and/or communication busses. Notwithstanding, the invention is not limited in this regard.

The networking subsystems 108a and 108b may comprise suitable logic, circuitry, and/or code that may be operable to handle functionality of OSI layer 2 and above layers in the network device 102 and 104, respectively. In this regard, networking subsystems 108 may each comprise a media access controller (MAC) and/or other networking subsystems. Each networking subsystem 108 may be operable to implement, switching, routing, and/or network interface card (NIC) functions. Each networking subsystems 108a and 108b may be operable to implement Ethernet protocols, such as those based on the IEEE 802.3 standard, for example. Notwithstanding, the invention is not limited in this regard. The networking subsystems 108a and 108b may communicate with the PHY devices 110a and 110b via interfaces 114a and 114b, respectively. The interfaces 114a and 114b may correspond to Ethernet interfaces that comprise protocol and/or link management control signals. The interfaces 114a and 114b may be, for example, multi-rate capable interfaces and/or media independent interfaces (MII).

The PHY devices 110 may each comprise suitable logic, circuitry, interfaces, and/or code that may enable communication between the network device 102 and the network device 104. Each of the PHY devices 110 may be referred to as a physical layer transmitter and/or receiver, a physical layer transceiver, a PHY transceiver, a PHYceiver, or simply a PHY. The PHY devices 110a and 110b may be operable to handle physical layer requirements, which include, but are not limited to, packetization, data transfer and serialization/deserialization (SERDES), in instances where such an operation is required. Data packets received by the PHY devices 110a and 110b from networking subsystems 108a and 108b, respectively, may include data and header information for each of the above six functional OSI layers. The PHY devices 110a and 110b may be configured to convert packets from the networking subsystems 108a and 108b into physical layer signals for transmission over the physical link 112. In some embodiments of the invention, the PHY devices 110 may comprise suitable logic, circuitry, and/or code operable to implement MACSec.

The PHY devices 110 may each support, for example, Ethernet over copper, Ethernet over fiber, and/or backplane Ethernet operations. The PHY devices 110 may each enable multi-rate communications, such as 10 Mbps, 100 Mbps, 1000 Mbps (or 1 Gbps), 2.5 Gbps, 4 Gbps, 10 Gbps, or 40 Gbps, for example. In this regard, each of the PHY devices 110 may support standard-based data rate limits and/or non-standard data rate limits. Moreover, the PHY devices 110 may each support standard Ethernet link lengths or ranges of operation and/or extended ranges of operation. Each of the PHY devices 110 may enable communication between the network device 102 and the network device 104 by utilizing a link discovery signaling (LDS) operation that enables detection of active operations in the other network device. In this regard the LDS operation may be configured for supporting a standard Ethernet operation and/or an extended range Ethernet operation. Each of the PHY devices 110 may also support autonegotiation for identifying and selecting communication parameters such as speed and duplex mode.

One or both of the PHY devices 110a and 110b may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

One or both of the PHY devices 110a and 110b may comprise a backplane PHY capable of operating at one or more standard rates such as 10 Gbps (10GBASE-KX4 and/or 10GBASE-KR); and/or non-standard rates such as 2.5 Gbps and 5 Gbps.

One or both of the PHY devices 110a and 110b may comprise an optical PHY capable of operating at one or more standard rates such as 10 Mbps, 10 GMbps, 1 Gbps, and 10 Gbps; potentially standardized rates such as 40 Gbps and 100

Gbps; and/or non-standardized rates such as 2.5 Gbps and 5 Gbps. In this regard, the optical PHY may be a passive optical network (PON) PHY.

One or both of the PHY devices 110a and 110b may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the network devices 102 and/or 104.

One or both of the PHY devices 110a and 110b may support transmission and/or reception at a high(er) data in one direction and transmission and/or reception at a low(er) data rate in the other direction. For example, the network device 102 may comprise a multimedia server and the network device 104 may comprise a multimedia client. In this regard, the network device 102 may transmit multimedia data, for example, to the network device 104 at high(er) data rates while the network device 104 may transmit control or auxiliary data associated with the multimedia content at low(er) data rates.

In various embodiments of the invention, each of the PHY devices 110a and 110b may be operable to implement one or more energy efficient techniques, which may be referred to as energy efficient networking (EEN), or in the specific case of Ethernet, energy efficient Ethernet (EEE). For example, the PHY devices 110a and 110b may be operable to support low power idle (LPI) and/or sub-rating, also referred to as subset PHY, techniques. LPI may generally refer a family of techniques where, instead of transmitting conventional IDLE symbols during periods of inactivity, the PHY devices 110a and 110b may remain silent and/or communicate signals other than conventional IDLE symbols. Sub-rating, or sub-set PHY, may generally refer to a family of techniques where the PHYs are reconfigurable, in real-time or near real-time, to communicate at different data rates.

In operation, the PHY devices 110a and 110b may be operable to support one or more EEN techniques, comprising for example, LPI, and sub-rate or subset PHY. Accordingly, an EEN control policy may be implemented in firmware, hardware, and/or software within the PHY devices 110a and 110b. An EEN/EEE control policy may implement functions defined by, related to, or in place of protocols defined by IEEE 802.3az. The EEN control policy may determine how and/or when to configure and/or reconfigure the PHY devices 110a and 110b to optimize the tradeoff between energy efficiency and performance. For LPI, the control policy may be utilized to determine, for example, what variant of LPI to utilize, when to go into a LPI mode and when to come out of a LPI mode. For subset PHY, the PHY devices 110a and 110b may be operable to determine, for example, how to achieve a desired data rate and when to transition between data rates. Although aspects of the invention are described with regard to LPI and subset PHY, the invention is not so limited and other EEN techniques may be implemented via a PHY based control policy.

The EEN control policy may be implemented at the physical layer and may be transparent to OSI Layer 2 and the OSI layers above. In this regard, in some embodiments of the invention, a control policy for implementing EEN/EEE protocols, such as protocols defined by IEEE 802.3az, may be implemented entirely in the physical layer. In other embodiments of the invention, the control may be partially implemented in the physical layer and partially implemented in OSI layer 2 and higher OSI layers. A PHY device that implements such an EEN control policy may thus be a drop-in replacement for a conventional PHY device. The EEN control policy implemented by the PHY device, may be compatible with a legacy MAC and/or legacy host. In this manner, implementing an EEN control policy in a PHY device 110 may enable reaping the benefits of a more energy efficient network while avoiding the need to redesign or "re-spin" all, or a portion of, a networking subsystem 108 and/or a host 106. Additionally, by implementing the EEN/EEE control policy at the physical layer hardware and/or software resources on a host 106 and/or networking system 108, that would otherwise be required for implementing the EEN/EEE policy, may be allocated for other functions.

Figure 2:
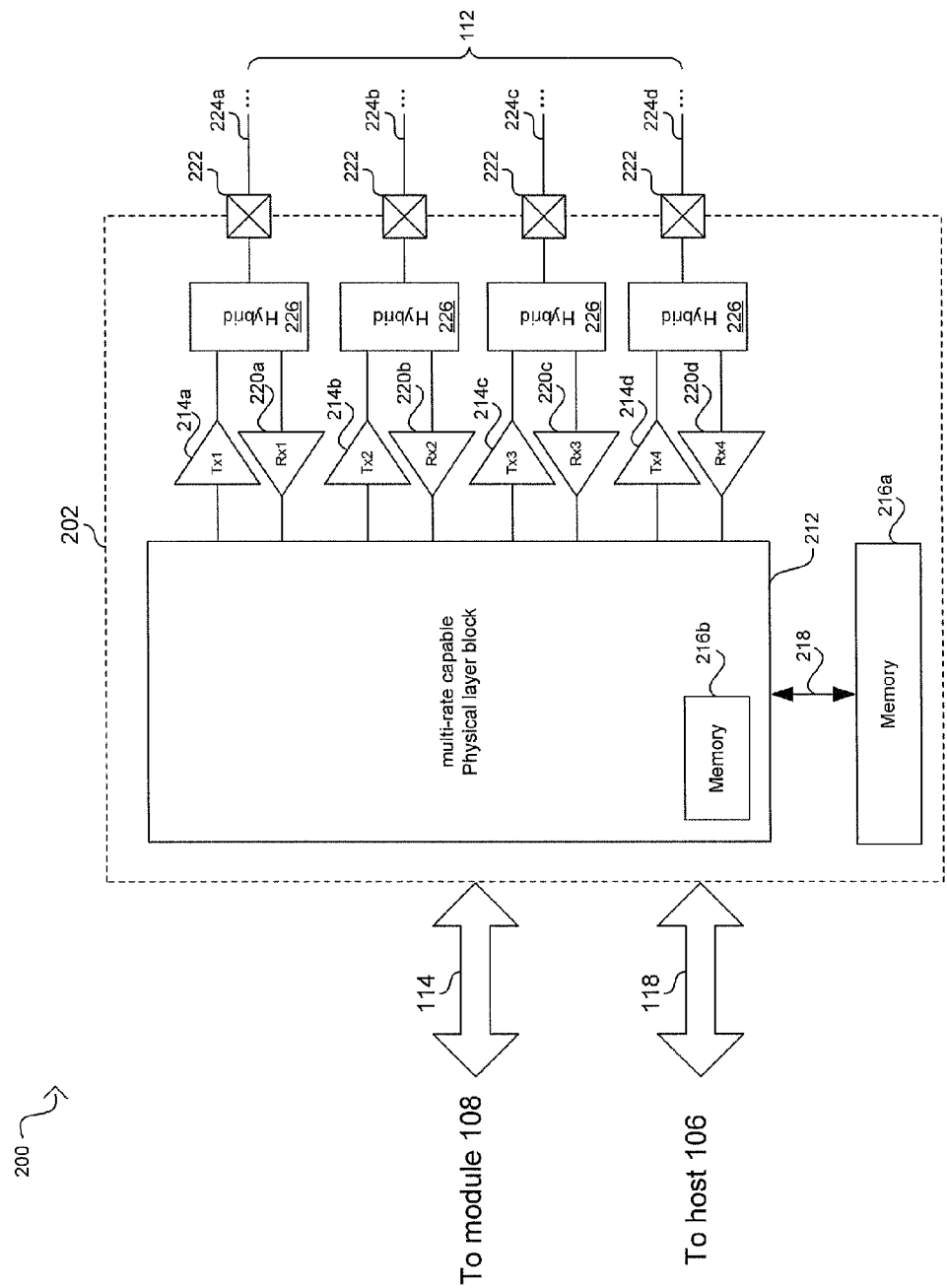
FIG. 2 is a block diagram illustrating an exemplary Ethernet over twisted pair PHY device architecture comprising a multi-rate capable physical block, in accordance with an embodiment of the invention.

FIG. 2 is a block diagram illustrating an exemplary Ethernet over twisted pair PHY device architecture comprising a multi-rate capable physical block, in accordance with an embodiment of the invention. Referring to FIG. 2, there is shown a network device 200 which may comprises an Ethernet over twisted pair PHY device 202 and the interface 114. The PHY device 202 may be an integrated device which may comprise a multi-rate capable physical layer module 212, one or more transmitters 214, one or more receivers 220, a memory 216, and one or more input/output interfaces 222.

The PHY device 202 may be an integrated device that comprises a multi-rate capable physical layer module 212, one or more transmitters 214, one or more receivers 220, a memory 216, a memory interface 218, and one or more input/output interfaces 222. The PHY device 202 may be the same as or substantially similar to the PHY devices 110a and 110b described with respect to FIG. 1. In this regard, the PHY device 202 may provide layer 1 (physical layer) operability and/or functionality that enables communication with a remote PHY device.

The interface 114 may be the same as or substantially similar to the interfaces 114a and 114b described with respect to FIG. 1. The interface 114 may comprise, for example, a media independent interface such as XGMII, GMII, or RGMII for communicating data to and from the PHY 202. In this regard, the interface 114 may comprise a signal to indicate that data from the network subsystem 108 to the PHY 110 is imminent on the interface 114. Such a signal is referred to herein as a transmit enable (TX_EN) signal. Similarly, the interface 114 may comprise a signal to indicate that data from the PHY 110 to the network subsystem 108 is imminent on the interface 114. Such a signal is referred to herein as a receive data valid (RX_DV) signal. The interface 114 may also comprise a control interface such as a management data input/output (MDIO) interface.

The multi-rate capable physical layer module 212 in the PHY device 202 may comprise suitable logic, circuitry, and/or code that may enable operability and/or functionality of physical layer requirements. In this regard, the multi-rate capable physical layer module 212 may enable generating the appropriate link discovery signaling utilized for establishing communication with a remote PHY device in a remote network device. The multi-rate capable physical layer module 212 may communicate with a MAC controller, and/or other OSI layer 2 and higher subsystems, via the interface 114. In one aspect of the invention, the interface 114 may be a media independent interface (MII) and may be configured to utilize a plurality of serial data lanes for receiving data from the multi-rate capable physical layer module 212 and/or for transmitting data to the multi-rate capable physical layer module 212. The multi-rate capable physical layer module 212 may be configured to operate in one or more of a plurality of communication modes, where each communication mode may implement a different communication protocol. These communication modes may include, but are not limited to, Ethernet over twisted pair standards 10BASE-T, 100BASE-TX, 1000BASE-T, 10GBASE-T, and other similar protocols that utilize multiple physical channels between network devices. The multi-rate capable physical layer module 212 may be configured to operate in a particular mode of operation upon initialization or during operation. In this regard, the PHY device 202 may operate in a normal mode or in one of a plurality of an energy saving modes. Exemplary energy saving modes may comprise a low power idle (LPI) mode and one or more sub-rate modes where the PHY device 202 may communicate at less than a maximum supported or initially negotiated data rate.

In various embodiments of the invention, the multi-rate capable physical layer module 212 may comprise suitable logic, circuitry, interfaces, and/or code for implementing an energy efficient networking or energy efficient Ethernet (EEN/EEE) control policy. Accordingly, the multi-rate capable physical layer module 212 may be operable to monitor one or more conditions and/or signals in the PHY device 202 and control mode of operation based on the monitoring. In this regard, the multi-rate capable physical layer module 212 may generate one or more control signals to configure and reconfigure the various components of the PHY device 202.

The multi-rate capable physical layer module 212 may comprise memory 216a and/or may be coupled to memory 216b through a memory interface 218. The memories 216a and 216b, referred collectively herein as memory 216, may comprise suitable logic, circuitry, and/or code that may enable storage or programming of information that includes parameters and/or code that may effectuate the operation of the multi-rate capable physical layer module 212. In this regard, the memory 216 may, for example, comprise one or more registers which may be accessed and/or controlled via a MDIO portion of the interface 114. Additionally, the memory 216 may buffer data received via the interface 114 prior to converting the data to physical symbols and transmitting it via one or more of the interfaces 222. For example, data from the interface 114 may be buffered while the PHY transitions from an energy saving mode to a higher performance mode—transitioning out of LPI mode or from a sub-rate to a higher data rate, for example. In this regard, a higher performance mode of operation may be mode in which the network device 200 may be operable to communicate data other than, for example, IDLE symbols. Or may be a mode in which the network device may communicate at greater than a minimal data rate. Also, the memory 216 may buffer data received via one or more of the interfaces 222 prior to packetizing or otherwise processing it and conveying it via the interface 114. For example, data received via the link 112 may be buffered in the memory 216 while higher layer functions and/or circuitry, such as a MAC or PCI bus, come out of an energy saving mode.

Each of the transmitters 214a, 214b, 214c, 214d, collectively referred to herein as transmitters 214, may comprise suitable logic, circuitry, interfaces, and/or code that may enable transmission of data from the network device 200 to a remote network device via, for example, the link 112 in FIG. 1. The receivers 220a, 220b, 220c, 220d may comprise suitable logic, circuitry, and/or code that may enable receiving data from a remote network device. Each of the transmitters 214a, 214b, 214c, 214d and receivers 220a, 220b, 220c, 220d in the PHY device 202 may correspond to a physical channel that may comprise the link 112. In this manner, a transmitter/receiver pair may interface with each of the physical channels 224a, 224b, 224c, 224d. In this regard, the transmitter/receiver pairs may be enabled to support various communication rates, modulation schemes, and signal levels for each physical channel. In this manner, the transmitters 214 and/or receivers 229 may support various modes of operation that enable managing energy consumption of the PHY device 202 and energy consumption on the link 112. Accordingly, one or more of the transmitters 214 and/or receivers 220 may be powered down and/or otherwise configured based on a mode of operation of the PHY device 202.

The input/output interfaces 222 may comprise suitable logic, circuitry, and/or code that may enable the PHY device 202 to impress signal information onto a physical channel, for example a twisted pair of the link 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium of the physical channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

Each hybrid 226 may comprise suitable logic, circuitry, interfaces, and/or code that may enable separating transmitted and received signals from a physical link. For example, the hybrids may comprise echo cancellers, far-end crosstalk (FEXT) cancellers, and/or near-end crosstalk (NEXT) cancellers. Each hybrid 226 in the network device 300 may be communicatively coupled to an input/output interface 222. One of more of the hybrids 226 may be enabled to support various modes of operation that enable managing energy consumption of the PHY device 202 and energy consumption on the link 112. Accordingly, portions of the hybrids 226 may be powered down and/or otherwise configured based on a mode of operation of the PHY device 202.

In operation, the network device 200 may communicate with a remote partner via the link 112. To optimize the tradeoff between performance and energy consumption, the PHY device 202 may implement a control policy, which may be utilized to determine when to transition between various modes of operation. In this regard, performance may be measured by a variety of metrics such as jitter, latency, bandwidth, and error rates.

In one exemplary embodiment of the invention, the control policy may determine when and how to utilize sub-rating to improve energy efficiency, Accordingly, the control policy may be utilized to determine what data rate to utilize, how to configure the various components of the PHY device 202 to realize a selected data rate, and when to transition between data rates. In this regard, the PHY device 202 may be operable to generate one or more control signals, based on the control policy, to configure or reconfigure the transmitters 214, receivers 220, hybrids 226, the memory 216, and/or one or more portions of the multi-rate capable PHY module 212. The PHY device 202 may also be operable to, based on the control policy, generate signals for communicating EEN/EEE states and/or decisions to a link partner.

In another exemplary embodiment of the invention, the control policy may make determinations as to when and how to utilize low power idle (LPI) to improve energy efficiency. Accordingly, the control policy may be utilized to determine when to go into an LPI mode, how to configure the various components of the PHY device 202 when in LPI mode, and when to come out of a LPI mode. The PHY device 202 may also be operable to, based on the control policy, generate signals for communicating EEN states and/or decisions to a link partner.

Figure 3A:
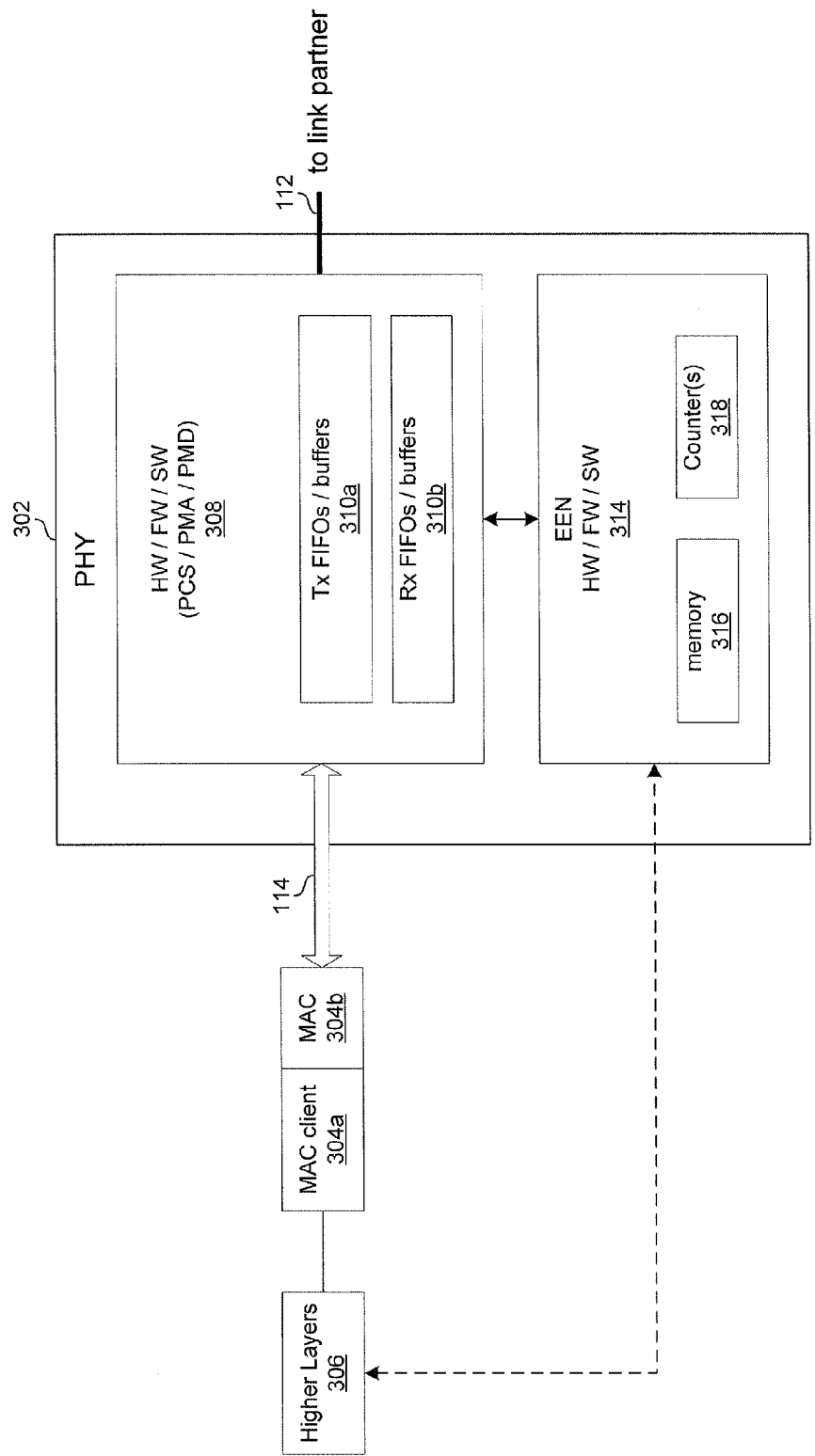
FIG. 3A is a block diagram illustrating an exemplary PHY device operable to implement a control policy for energy efficient networking, in accordance with an embodiment of the invention.

FIG. 3A is a block diagram illustrating an exemplary PHY operable to implement a control policy for energy efficient networking, in accordance with an embodiment of the invention. Referring to FIG. 3A, there is shown OSI layers above the MAC represented generically as block 306, a MAC client 304a, a MAC 304b and a PHY device 302. The PHY device 302 may comprise a module 308 for implementing the physical coding sublayer (PCS), the physical media attachment (PMA) sublayer and/or the physical media dependent (PMD) sublayer; and an EEN/EEE module 314. The module 308 may comprise one or more transmit buffers 310a, one or more receive buffers 310b.

The block 308 may be substantially similar to the hosts 106 described with respect to FIG. 1. The combination of the MAC client 304a and the MAC 304b may perform functions substantially similar to a network subsystem 108 described with respect to FIG. 1. The MAC client 304a may, for example, implement multiplexing and flow control to enable multiple network layer protocols to coexist and utilize the MAC 304b and the PHY 302. The MAC client 304a may be, for example, the logical link control (LLC) sub-layer defined in IEEE 802.2. The MAC 304b may perform data encapsulation and/or media access management, where media access management may comprise operations that handle conflicts arising from multiple network devices sharing a common physical medium. An exemplary operation may comprise arbitration and negotiation.

The PHY device 302 may comprise suitable logic, circuitry, interfaces and/or code that may be operable to implement physical layer functionality. In this regard, the physical coding sublayer (PCS), physical medium attachment (PMA) sublayer, and physical medium dependent (PMD) sublayer may be implemented via hardware, firmware, and/or software represented as module 308. The module 308 may be operable to perform one or more of physical encoding and/or decoding, PMA framing, and transmitter and/or receiver operations. The module 308 may comprise one or more transmit buffers 310a that may be operable to store data received via the interface 114 and destined for transmission on the link 112. The module 308 may comprise one or more receive buffers 310b that may be operable to store data received via the link 112 and destined for the MAC 304b.

The PHY device 302 may also comprise an EEN/EEE module 314 which may, in turn, comprise suitable logic, circuitry, and/or code that may be operable to implement an EEN control policy. The EEN/EEE control policy may be operable to balance the tradeoff between performance and power consumption in the PHY 302 and/or on the link 112. In various exemplary embodiments of the invention, the PHY device 302 may comprise memory 316 and/or one or more counters 318. In addition, the module 314 may be operable to generate EEN control information to be communicated to a link partner and/or process EEN control information received from a link partner.

The memory 316 may comprise one or more state registers and/or configuration registers for implementing the EEN/EEE control policy. The state registers may be read and/or written via, for example, a MDIO bus to the MAC 304a and/or one or more signals from the higher OSI layers 306. Additionally, the memory 316 may be allocated, de-allocated, and reallocated to supplement the Tx buffer 310a and/or the Rx buffer 310b.

In operation, the EEN/EEE control policy may make decisions such as when to enter and/or exit a low(er) power mode. EEN/EEE control policy decisions and the resulting actions, such as reconfiguring the PHY 302, may be determined based on one or more signals and/or conditions monitored in the PHY 302. Several examples of factors which may be considered by the control policy follow. Many of the examples are simplified and various embodiments of the invention may utilize a combination of two or more of them. Nevertheless, the invention is not limited to the examples provided.

Implementation of the EEN/EEE protocols and/or techniques may be based, for example, on an amount of data buffered in the buffers 310 and/or the memory 316. For example, in instances that the Tx buffer 310a is empty, or is empty for a certain amount of time, portions of the PHY 302 associated with data transmission may be reconfigured into a low(er) power state. Similarly, in instances that the Rx buffer 310b is empty, or is empty for a certain amount of time, portions of the PHY 302 associated with data reception may be reconfigured into a low(er) power state. In some embodiments of the invention, configuration of transmit portions of the PHY 302 may be determined based on a configuration of receive portions of the PHY 302, and visa versa—configuration of receive portions of the PHY 302 may be determined based on a configuration of receive portions of the PHY 302. Strapping configuration of the transmit portion to configuration of the receive portion in this manner may be based on the assumption that no traffic received from a link partner may correlate to no traffic being sent to the link partner. Such an assumption may be useful, for example, in core devices such as switches or routers that have limited ability to predict traffic on the link.

Implementation of the EEN/EEE protocols and/or techniques, such as determining when to transition between modes of operation, may be based, for example, on one or more counters and/or registers in the block 314. For example, in instances that the TX_EN of the interface 114 has not been asserted for a statically or dynamically determined period of time, portions of the PHY 302 associated with data transmission may be reconfigured into a low(er) power state. Similarly, in instances that data has not been received via the link 112, and/or that the link has been in IDLE, for a statically or dynamically determined period of time, portions of the PHY 302 associated with data reception may be reconfigured into a low(er) power state. Additionally, values of the counter may be stored and historical values of the counter may be utilized to predict when the PHY 302 may transition to a low(er) power mode without having a significant negative impact on performance.

Implementation of the EEN protocols and/or techniques, such as determining when to transition between modes of operation, may be based, for example, on management signals of an MDIO bus to the MAC 304b. For example, the MDIO may configure thresholds such as how long the PHY 302 should stay in a low(er) power mode after entering the low(er) power mode, how long a buffer should be empty before going into a low(er) power mode, and how full a buffer should be before waking up from a low(er) power mode. The MDIO may also be utilized to configure parameters pertaining to a link partner. Exemplary parameters comprise how long the link partner takes to wake up and how much buffering is available in the link partner's buffers. The MDIO may enable configuration of the control policy by a system designer or administrator.

Implementation of the EEN/EEE protocols and/or techniques, such as determining when to transition between modes of operation, may be based, for example, on signals from the block 306, such as signals generated by a PCI bus controller and/or a CPU. For example, a signal indicating whether the PCI bus is active may be utilized to predict whether data will be arriving at the PHY 302 and/or to determine whether the higher OSI layers 306 are ready to receive data from the PHY 302. For another example, signals from a CPU, or other data processing components in the block 306, may indicate a type of traffic communicated to the PHY 302 and the control policy may determine an appropriate mode of operation of the PHY 302 and/or an appropriate allocation of buffering, or other resources, in the PHY 302 based on the data type. In this regard, Implementation of the EEN/EEE protocols and/or techniques, such as determining when to transition between modes of operation, may be based, for example, on latency constraints of the traffic to be transmitted via the link 112 or communicated up to the MAC 304a. In instances when latency is not a problem, a series of traffic bursts may be buffered for an acceptable amount of time before waking the PHY device 302, the MAC 304, and/or higher layer functions for delivery of the accumulated traffic bursts.

Implementation of the EEN/EEE protocols and/or techniques, such as determining when to transition between modes of operation, may be based, for example, on signals received from a link partner to which the PHY 302 is communicatively coupled. In this regard, going into and coming out of low(er) power modes may require agreement by the link partner, or at least awareness of what the link partner is doing. For example, in instances that the link partner takes longer to wake up then the PHY 302, the PHY 302 may need to plan accordingly and allocate sufficient memory to the Tx buffer 310a. Conversely, in instances that the link partner wakes up faster than the PHY 302, the PHY 302 may need to plan accordingly and allocate sufficient memory to the Rx buffer 310b and/or instruct the link partner to increase its Tx buffer to hold off transmissions. A similar situation may occur when a link partner has less buffering available than the PHY 302. Accordingly, in some embodiments of the invention, the control policy may be utilized to dynamically allocate and reallocate as the memory 316, for example, to supplement the Tx buffer 310 or the Rx buffer 310b.

Implementation of the EEN/EEE protocols and/or techniques, such as determining when to transition between modes of operation, may be based, for example, on a type, format, and/or content of packet(s) and/or traffic received from a link partner to which the PHY 302 is communicatively coupled. In this regard, certain distinct packets and/or packet types may trigger the PHY 302 to transition to an energy saving mode and certain distinct packets and/or packet types may trigger the PHY 302 to transition out of an energy saving mode. Also, the PHY 302 may determine how long it may buffer ingress and/or egress traffic based on a type, format, and/or content of packet(s) and/or traffic received.

Figure 3B:
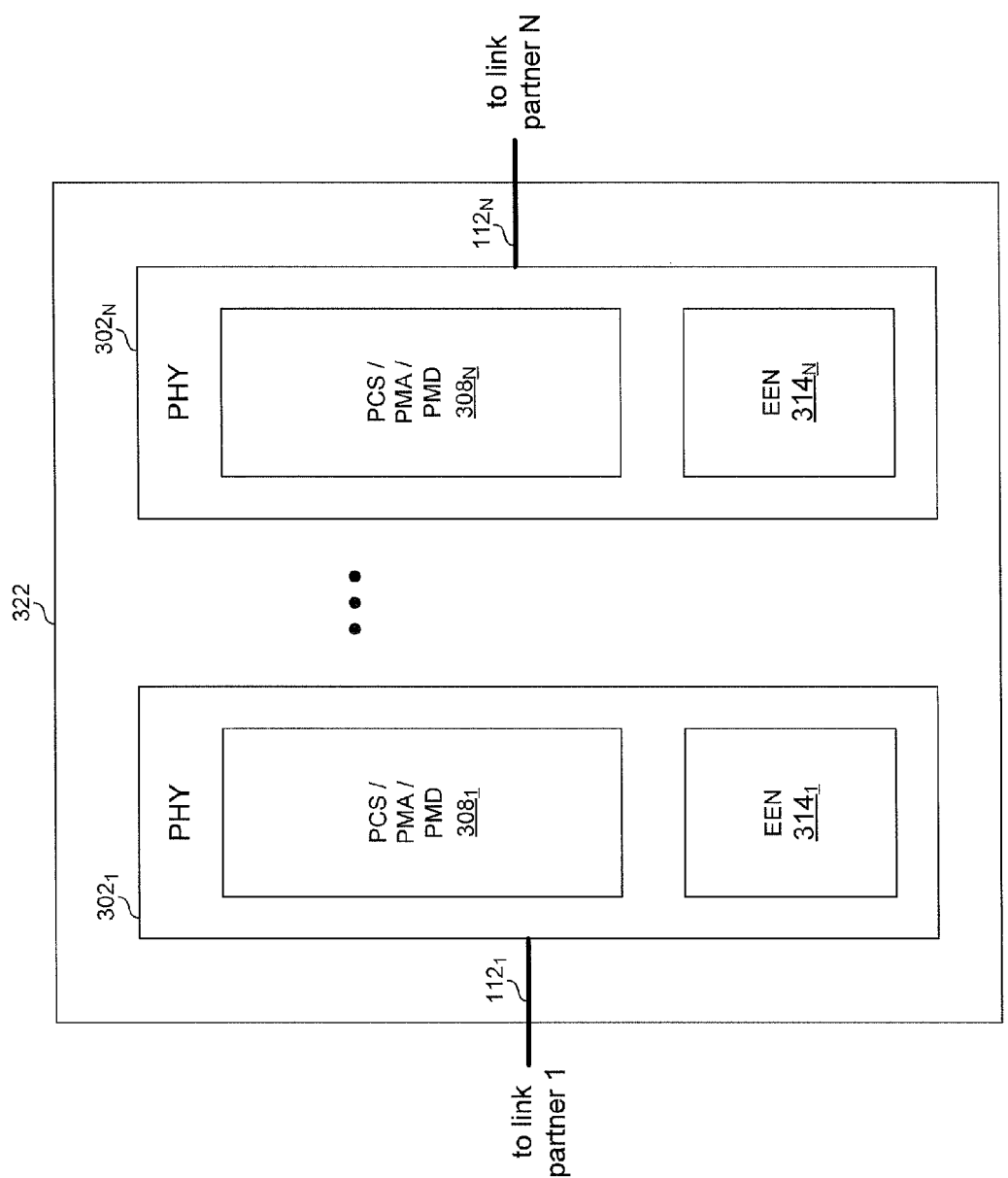
FIG. 3B is a diagram illustrating multiple PHY devices integrated on chip, wherein each PHY device is operable to implement an EEN control policy, in accordance with an embodiment of the invention.

FIG. 3B is a diagram illustrating multiple PHY devices integrated on chip, wherein each PHY device is operable to implement an EEN/EEE control policy, in accordance with an embodiment of the invention. Referring to FIG. 3B, there is shown a substrate 322 on which a plurality of PHY devices $302_1, \ldots, 302_N$ are fabricated, where N is an integer. Each of the PHYs $302_1, \ldots, 302_N$ may comprise a module 308 which may be as described with respect to FIG. 3A. Each of the PHYs $302_1, \ldots, 302_N$ may comprise an EEN module 314 which may be as described with respect to, for example, FIG. 3A.

In operation, each module $314_X$, where X is an integer between 1 and N, may manage power consumption and performance of PHY $302_X$ independently of the other N−1 PHYs. For example, some of the PHYs $302_1, \ldots, 302_N$ may utilize LPI techniques while other may utilize sub-rating. Furthermore, a PHY $302_X$ may go into and come out of LPI mode at different times and/or based on different factors than one or more of the other N−1 PHYs. Similarly, a PHY $302_X$ utilizing sub-rating may operate at a data rate determined independently of the data rate utilized by one or more of the other N−1 PHYs.

Figure 3C:
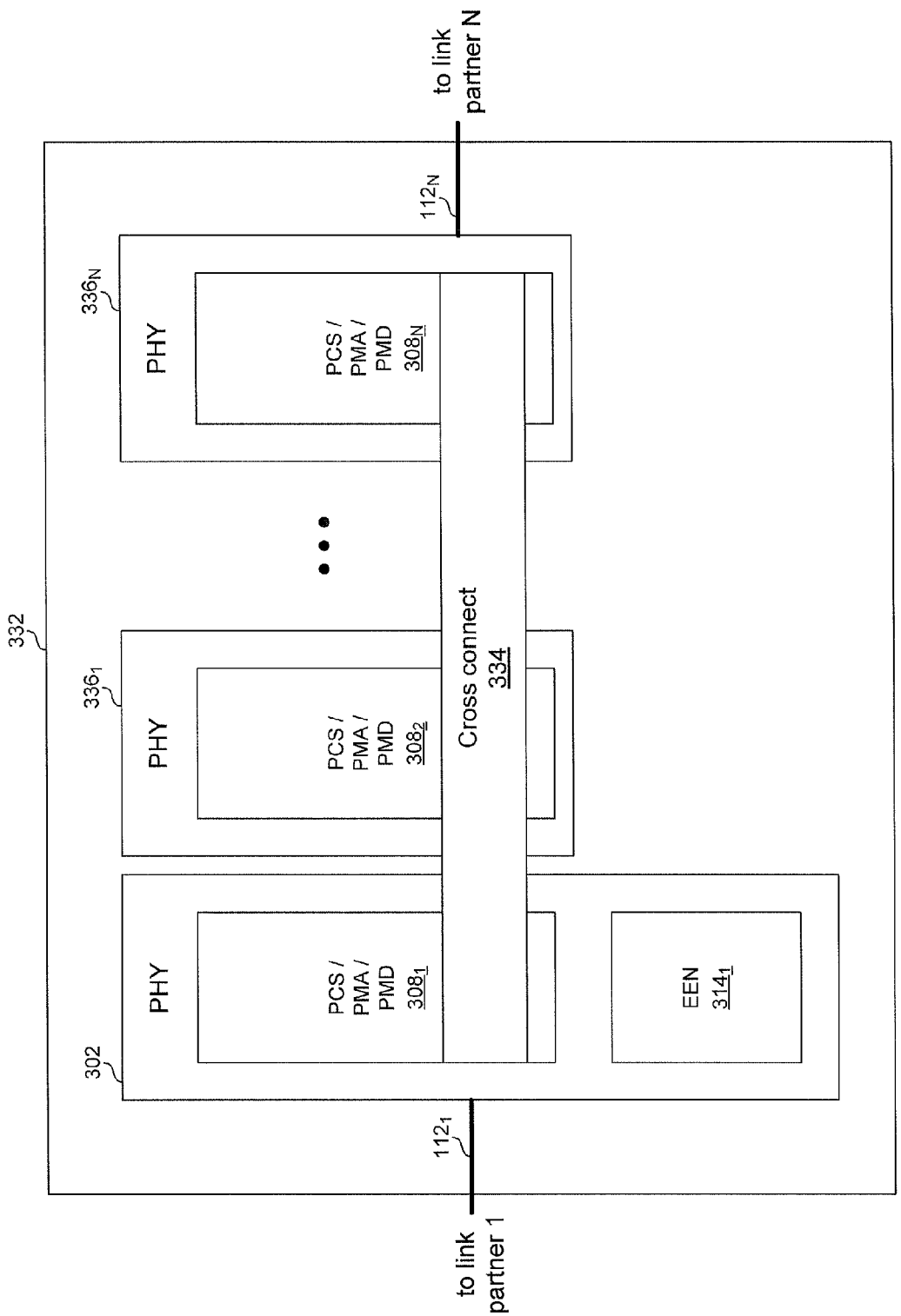
FIG. 3C is a diagram illustrating multiple PHY devices integrated on chip managed and managed by a plurality of EEN control policies, in accordance with an embodiment of the invention.

FIG. 3C is a diagram illustrating multiple PHY devices integrated on chip and managed by a plurality of EEN/EEE control policies, in accordance with an embodiment of the invention. Referring to FIG. 3C, there is shown a substrate 332 on which a PHY device 302 and one or more PHY devices $336_1, \ldots, 336_N$ are fabricated, where N is an integer. The PHYs 302 and $336_1, \ldots, 336_N$ may be communicatively coupled via a cross connect 334. Each of the 302 and $336_1, \ldots, 336_N$ may comprise a module 308 which may be as described with respect to FIG. 3A. The PHY 302 may also comprise a module 314 which may be as described with respect to FIG. 3A. Although the substrate 332 comprises only a single PHY 302, the invention is not so limited. In this regard, the substrate 332 may comprise a plurality of PHYs 302, each of which may be operable to manage power consumption of a subset of the PHYs $336_1, \ldots, 336_N$.

In operation, the module $314_1$ may mange power consumption and performance of the PHYs 302 and $336_1, \ldots, 336_N$. In this regard, signals for implementing an EEN control policy may be communicated between the PHY 302 and the PHYs $336_1, \ldots, 336_N$ via the cross connect 334. Utilizing a common control policy for multiple PHYs may enable, for example, load balancing to achieve greater energy efficiency. In various embodiments of the invention, the PHYs may each utilize a common EEN technique, such as LPI. In other embodiments of the invention, the module $314_1$ may generate one set of control signals that are communicatively coupled to each of the PHYs $336_1, \ldots, 336_N$. In this regard, a manner in which each of the PHYs may be reconfigured based on the set of common signals may differ from one PHY to the next.

Figure 4A:
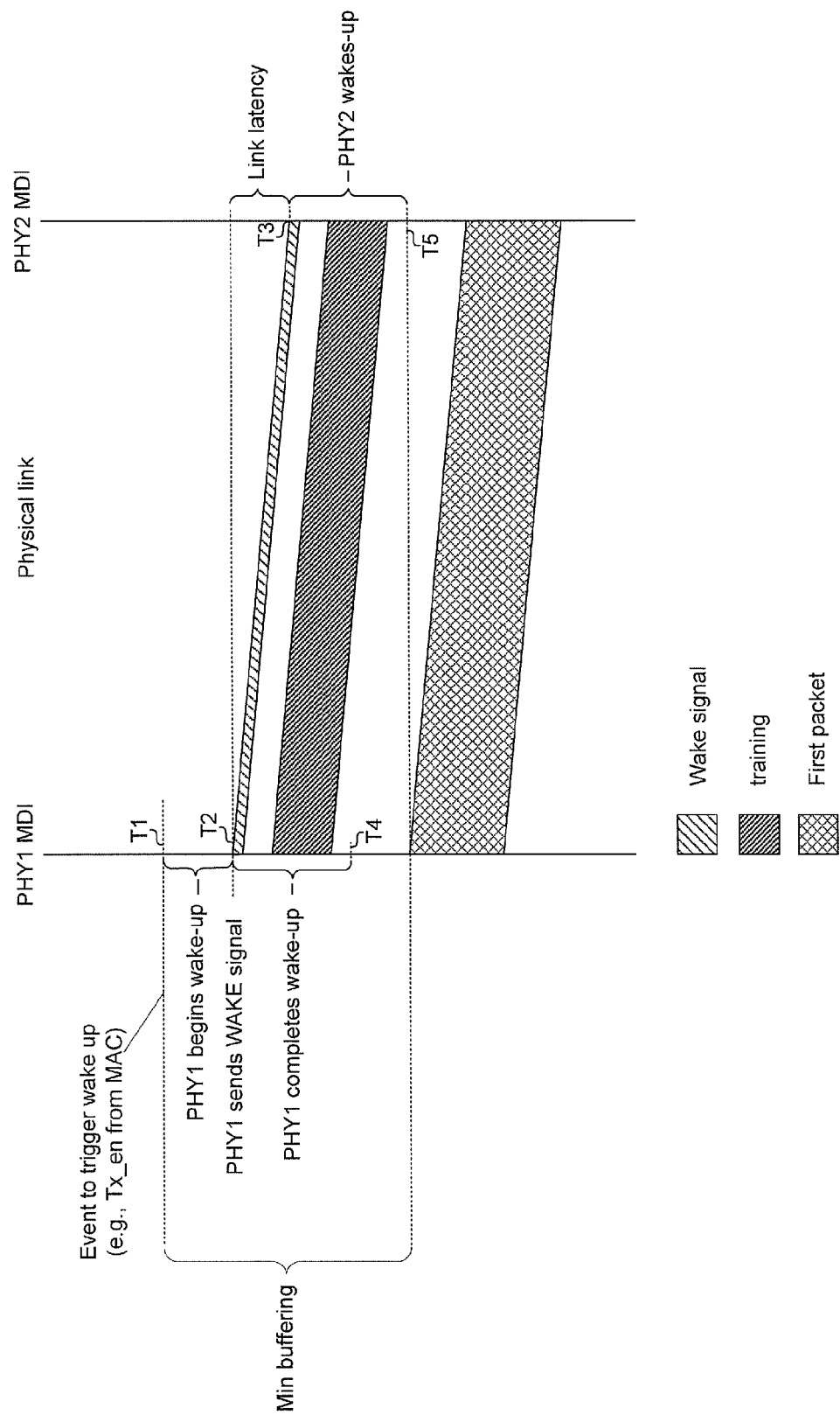
FIG. 4A is a diagram illustrating two link partners transitioning to a high(er) power mode of operation, in accordance with an embodiment of the invention.

FIG. 4A is a diagram illustrating two link partners transitioning to a high(er) power mode of operation, in accordance with an embodiment of the invention. In this regard, FIG. 4A illustrates an EEN/EEE control policy that reduces overall transition time by enabling portions of the transition in the first link partner to overlap in time with portions of the transition in the second link partner.

At time instant T1 a control policy in a first link partner may trigger a transition from a low(er) power mode of operation to a high(er) power mode of operation. For example, a transition from a high(er) latency and low(er) energy mode, such as an LPI mode, to a low(er) latency and high(er) power mode. In an exemplary embodiment of the invention, the control policy may reside in a PHY (PHY 1) of the first link partner and may be utilized to trigger the transition upon detecting an assertion of TX_EN from a MAC communicatively coupled to PHY 1.

From time instant T1 to time instant T2, PHY 1 may begin transitioning out of the LPI mode. In this regard, various portions of PHY 1 may begin to power up and stabilize.

At time instant T2, PHY 1 may be sufficiently powered up and/or stable such that the first link partner may transmit an indication onto the physical link destined for the PHY (PHY 2) of the second link partner. In this regard, the indication may be a very simple physical layer signal such that many functions of the PHY 1 may not need to be powered up and/or stabilized in order to generate the signal. That is, the indication may be, for example, a simple pulse, series of pulses, and/or a DC voltage. In this manner, complex signal processing techniques may not be needed to transmit, receive, and/or understand the indication. In the case of Ethernet, the indication may be a "WAKE" signal.

From time instant T2 to time instant T4 PHY 1 may continue power-up and reconfiguration associated with the transition in mode of operation. During this interval, at time instant T3, the indication may arrive at PHY 2. Upon reception of the indication at PHY 2, the EEN/EEE control policy of PHY 2 may trigger PHY 2 to transition to a different mode of operation. Accordingly, from time instant T3 to time instant T4, power-up and reconfiguration of PHY 2 may occur in parallel with power-up and reconfiguration of PHY 1. In various embodiments of the invention, the power-up and reconfiguration of PHY 1 and PHY 2 may comprise the exchange of LLDP frames and/or other training information.

At time instant T4, PHY 1 may complete the transition and may be ready to begin sending packets over the physical link. However, PHY 2 may not complete the transition until T5. Accordingly, the first link partner may need to wait until T5 (ignoring propagation delays over the physical link) to begin transmitting packets such that they may be reliably received by PHY 2. In instances that time instant T5 occurs before T4, PHY 1 may begin transmitting at time instant T4. In some embodiments of the invention, the first link partner may have knowledge of how long PHY 2 takes to transition, e.g., based on previously exchanged information and/or information configured by a network administrator. In other embodiments of the invention, the second link partner may transmit an indication, which may be of the same format as the indication sent by the first link partner, to indicate that it is ready to receive.

Thus, in instances that time instant T5 is after time instant T4, the first link partner may need to buffer data received from the MAC from time instant T1 until time instant T5. Similarly, in instances that time instant T5 is before time instant T4, the first link partner may need to buffer data received from time instant T1 until time instant T4. In various embodiments of the invention, PHY 1 may be an EEN and/or EEE enabled PHY, such as the PHY 302 described with respect to FIG. 3, and may thus buffer the data in the PHY. In this manner, the transition and signaling may be implemented by an energy efficient PHY that is coupled to a legacy MAC that is unaware of the transitioning.

Figure 4B:
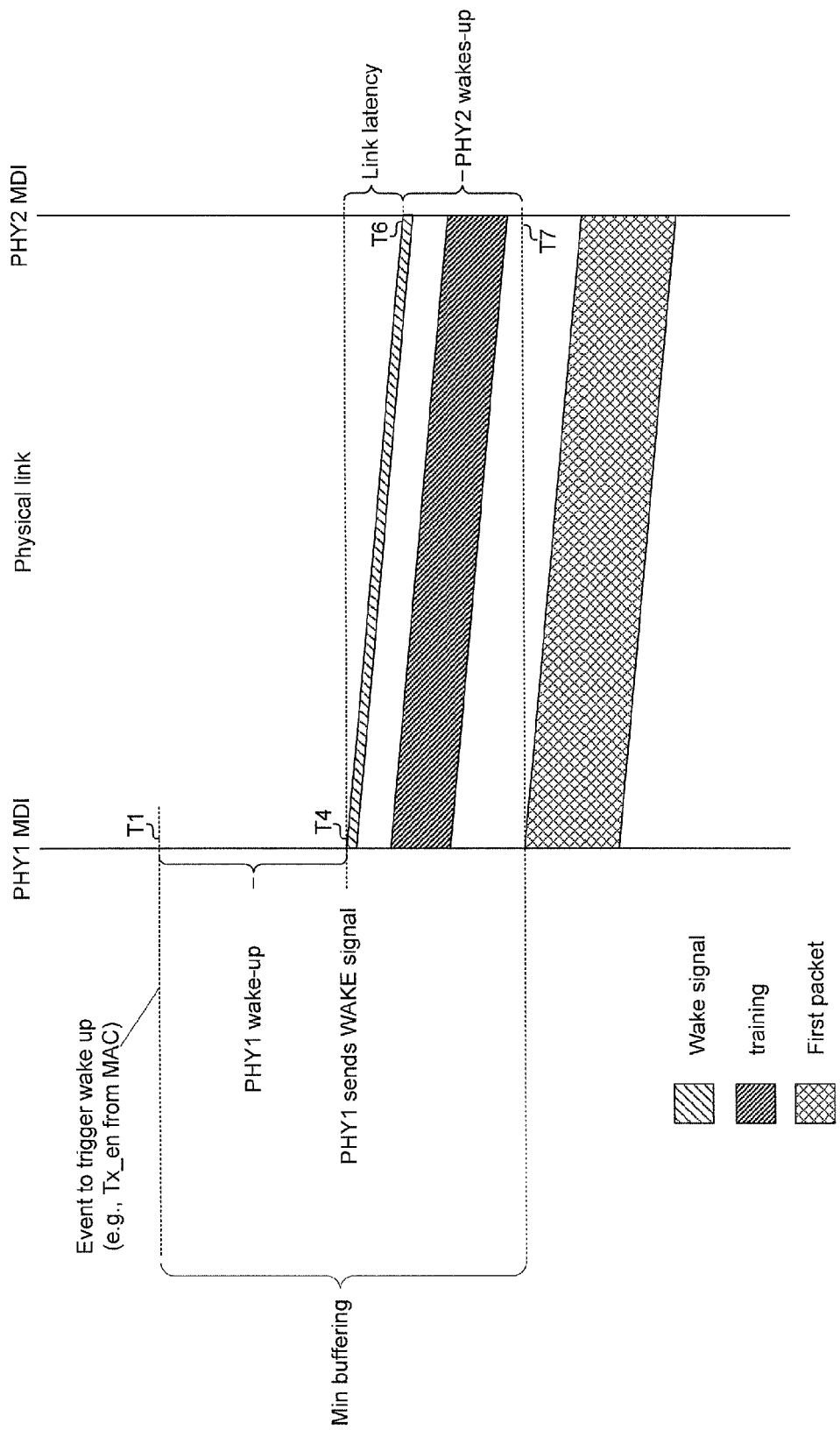
FIG. 4B is a diagram illustrating two link partners transitioning to a high(er) power mode of operation, in connection with an embodiment of the invention.

FIG. 4B is a diagram illustrating two link partners transitioning to a high(er) power mode of operation, in connection with an embodiment of the invention. FIG. 4B illustrates wake-up of two link partners, without reduced transition time. That is, the transition of FIG. 4B powering up portions of PHY 1 do not overlap in time with powering up of portions of PHY 2, and thus link partner 1 may need to buffer data from time instant T1 until time instant T7, as opposed to buffering from time instant T1 until time instant T4 in FIG. 4A.

Figure 5:
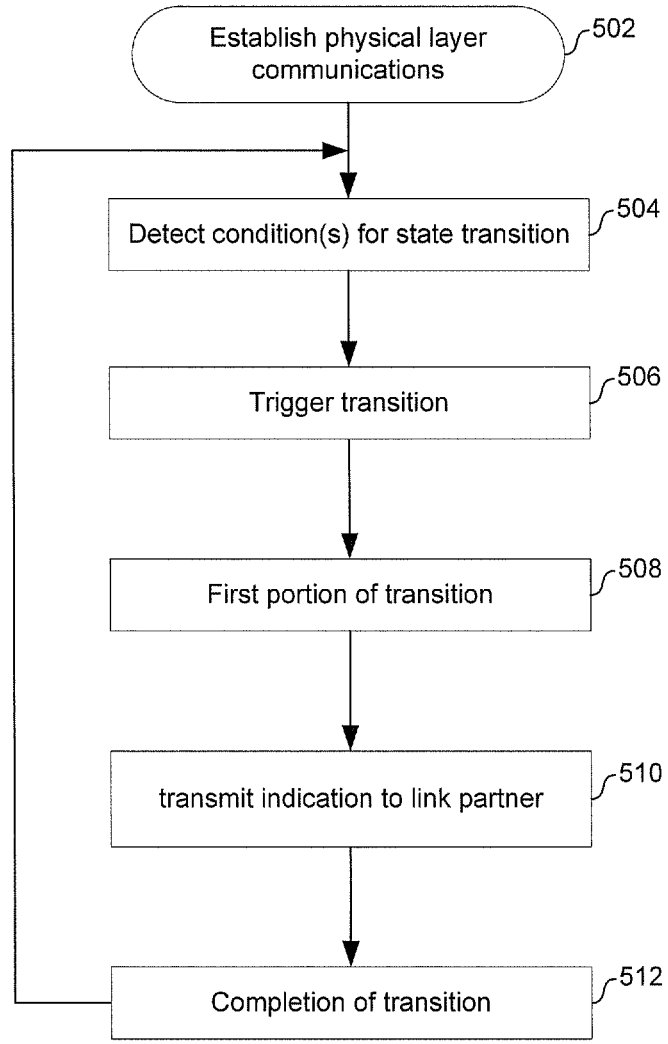
FIG. 5 is a flow chart illustrating exemplary steps implementing an EEN control policy in a physical layer device, in accordance with an embodiment of the invention.

FIG. 5 is a flow chart illustrating exemplary steps implementing an EEN/EEE control policy in a physical layer device, in accordance with an embodiment of the invention. Referring to FIG. 5, the exemplary steps may begin with step 602 when communications may be established between a PHY (PHY 1) of a first link partner and a PHY (PHY 2) of a second link partner. Subsequent to step 502, the exemplary steps may advance to step 504.

In step 504, an EEN/EEE control policy implemented in the first link partner may, based on one or more conditions present in the first link partner, be utilized to determine that PHY 1 should transition to a different mode of operation. In this regard, the control policy may be utilized to determine how to configure the PHY 1 for the different mode and when to perform the transition. Subsequent to step 504 the exemplary steps may advance to step 506.

In step 506, the control policy may trigger the transition. In this regard, one or more control signals may be generated in the first link partner to reconfigure one or more components of the PHY 1 to implement the different mode of operation. Subsequent to step 506, the exemplary steps may advance to step 508.

In step 508, a first portion of the transition may occur. In this regard a portion of the PHY 1 may be powered up and/or reconfigured to implement the different mode of operation. For example, the transmitters 214 and/or the receivers 222 may be powered up. In various embodiments of the invention, during step 510, the PHY 1 may be powered up to a minimal level of operation that may enable transmission of an EEN/EEE event indication. Subsequent to step 508, the exemplary steps may advance to step 510.

In step 510, PHY 1 may transmit an indication, which may be a WAKE signal for Ethernet implementations, to PHY 2 to indicate that it desires, and/or has decided, to transition to a different state of operation. In this regard, the indication may cause an EEN and/or EEE control policy on the PHY 2 to trigger a transition to a new mode of operation and/or to reallocate resources such as buffers. Subsequent to step 510, the exemplary steps may advance to step 512.

In step 512, PHY 2 may complete the transition to the different mode of operation. That is, a remaining portion of the PHY 1 that requires reconfiguring to complete the transition may be reconfigured. For example, FEXT, NEXT, and echo cancellers may be powered up. In some embodiments of the invention, the transition may comprise training of one or more components such as the NEXT, FEXT, and echo cancellers. In this regard, during step 512, the PHY1 may power up to a level of functionality required to reliably send and receive packets at a selected data rate. Subsequent to step 512, the PHY 1 may operate in the different mode of operation and until the control policy determines to transition again.

Various aspects of a method and system for physical layer control of energy efficient network devices and protocols are provided.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for low latency state transitions for energy efficiency.

Aspects of a method and system for low latency state transitions for energy efficiency are provided. In various embodiments of the invention, a determination may be made to reconfigure a network device 102 from an energy saving mode of operation to a higher performance mode of operation. A first portion of the network device 102 may be reconfigured prior to sending an indication of the reconfiguration to a link partner, and a remaining portion of the network device 102 may be reconfigured after sending the indication. The link partner 104 may begin reconfiguration from an energy saving mode of operation to higher performance mode of operation upon receiving the indication. The indication may comprise one or more physical layer signals and/or packets. Components of the network device that may be reconfigured may comprise one or more transmitters 214, receivers 220, NEXT cancellers, FEXT cancellers, and/or echo cancellers of the network device 102. The energy saving mode may comprise a low power idle (LPI) mode. The energy saving mode may comprise a subset PHY mode. The reconfiguration may comprise allocating memory to, and/or de-allocating memory from, buffering received and/or to-be-transmitted data. The memory may be allocated or de-allocated based on an amount of time required for the reconfiguration. The memory may be allocated or de-allocated based on an amount of time required for reconfiguration of the link partner 104 communicatively coupled to the network device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
performing by one or more circuits in a network device:
operating the network device in a first operating mode, the first operating mode representing an energy saving state of the network device;
in response to a detection of a need to transition the network device from the first operating mode to a second operating mode where the network device operates in an active state, first reconfiguring a first portion of the network device, wherein the first reconfiguring only partially transitions the network device from the first operating mode to the second operating mode;
after the first reconfiguring produces the partial transition from the first operating mode to the operating mode, sending an indication to a link partner of a need for the link partner to transition from the first operating mode to the second operating mode; and
after sending the indication, second reconfiguring a second portion of the network device, wherein the second reconfiguring completes the transition of the network device from the first operating mode to the second operating mode.

2. The method according to claim 1, wherein the link partner begins reconfiguration from the first operating mode to the second operating mode upon receiving the indication.

3. The method according to claim 1, wherein the indication comprises one or more physical layer signals.

4. The method according to claim 1, wherein the indication comprises one or more packets.

5. The method according to claim 1, wherein the reconfiguring comprises reconfiguring one or more transmitters, receivers, NEXT cancellers, FEXT cancellers, and/or echo cancellers of the network device.

6. The method according to claim 1, wherein the first operating mode is a low power idle (LPI) mode.

7. The method according to claim 1, wherein the first operating mode is a subset physical layer device mode.

8. The method according to claim 1, further comprising allocating memory for use in buffering data.

9. The method according to claim 7, wherein the allocating is based on an amount of time for reconfiguring the network device.

10. The method according to claim 7, wherein the allocating is based on an amount of time for reconfiguring the link partner.

11. A system, comprising:
one or more circuits for use in a network device, the one or more circuits operable to:
operate the network device in a first operating mode, the first operating mode representing an energy saving state of the network device;
in response to a detection of a need to transition the network device from the first operating mode to a second operating mode where the network device operates in an active state, first reconfigure a first portion of the network device, wherein the first reconfiguring only partially transitions the network device from the first operating mode to the second operating mode;
after the first reconfiguring produces the partial transition from the first operating mode to the operating mode, send an indication to a link partner of a need for the link partner to transition from the first operating mode to the second operating mode; and
after sending the indication, second reconfigure a second portion of the network device, wherein the second reconfiguring completes the transition of the network device from the first operating mode to the second operating mode.

12. The system according to claim 11, wherein the link partner begins reconfiguration from the first operating mode to the second operating mode upon receiving the indication.

13. The system according to claim 11, wherein the indication comprises one or more physical layer signals.

14. The system according to claim 11, wherein the indication comprises one or more packets.

15. The system according to claim 11, wherein the one or more circuits are operable to reconfigure one or more transmitters, receivers, NEXT cancellers, FEXT cancellers, and/or echo cancellers of the network device.

16. The system according to claim 11, wherein the first operating mode is a low power idle (LPI) mode.

17. The system according to claim 11, wherein the second operating mode is a subset PHY mode.

18. The system according to claim 11, wherein the one or more circuits are operable to allocate memory for use in buffering data.

19. The system according to claim 18, wherein the one or more circuits are operable to allocate memory based on an amount of time for reconfiguring the network device.

20. The system according to claim 18, wherein the one or more circuits are operable to allocate memory buffering based on an amount of time for reconfiguring the link partner.

* * * * *